Sept. 27, 1966 K. H. ANDREN ET AL 3,274,664

TERMINAL ATTACHING DEVICE

Filed June 12, 1964 12 Sheets-Sheet 1

INVENTORS
K. H. ANDREN
C. R. TUTTLE
BY
Lieber & Nilles
ATTORNEYS

INVENTORS
K. H. ANDREN
C. R. TUTTLE
BY
Lieber & Nilles
ATTORNEYS

INVENTORS
K. H. ANDREN
C. R. TUTTLE
BY
Lieber & Nilles
ATTORNEYS

TERMINAL ATTACHING DEVICE

Filed June 12, 1964 12 Sheets-Sheet 4

INVENTORS
K. H. ANDREN
C. R. TUTTLE
BY
Lieber & Nilles
ATTORNEYS

TERMINAL ATTACHING DEVICE

INVENTORS
K. H. ANDREN
C. R. TUTTLE
BY Lieber & Nilles
ATTORNEYS

TERMINAL ATTACHING DEVICE

Filed June 12, 1964

INVENTOR.
K. H. ANDREN
C. R. TUTTLE

BY Lieber & Nilles

ATTORNEYS

TERMINAL ATTACHING DEVICE

Filed June 12, 1964

INVENTORS
K. H. ANDREN
C. R. TUTTLE
BY
Lieber & Nilles
ATTORNEYS

INVENTORS
K. H. ANDREN
C. R. TUTTLE
BY
Lieber & Nilles
ATTORNEYS

TERMINAL ATTACHING DEVICE

Filed June 12, 1964

INVENTORS
K. H. ANDREN
C. R. TUTTLE

BY
Lieber & Miller
ATTORNEYS

Sept. 27, 1966 K. H. ANDREN ETAL 3,274,664

TERMINAL ATTACHING DEVICE

Filed June 12, 1964 12 Sheets-Sheet 10

INVENTORS
K. H. ANDREN
C. R. TUTTLE
BY
Lieber & Nilles
ATTORNEYS

TERMINAL ATTACHING DEVICE

Filed June 12, 1964 12 Sheets-Sheet 11

INVENTORS
K. H. ANDREN
C. R. TUTTLE
BY
Lieber & Nilles
ATTORNEYS

TERMINAL ATTACHING DEVICE

Filed June 12, 1964 12 Sheets-Sheet 12

INVENTORS
K. H. ANDREN
C. R. TUTTLE
BY
Lieber & Nilles
ATTORNEYS

United States Patent Office 3,274,664

Patented Sept. 27, 1966

3,274,664

TERMINAL ATTACHING DEVICE

Karl H. Andren, West Allis, and Clarence R. Tuttle, Milwaukee, Wis., assignors to Artos Engineering Company, Milwaukee, Wis., a corporation of Wisconsin Filed June 12, 1964, Ser. No. 374,592
8 Claims. (Cl. 29—33)

This invention relates generally to improvements in the art of producing electric conductors from multiple conductor cord wire stock, and it relates more specifically to an improved method and apparatus for applying terminals to the cord wire stock.

The primary object of the present invention is to provide an improved terminal attaching apparatus for accurately, efficiently, and simultaneously applying terminals to multiple conductors of cord wire stock.

An example of apparatus for producing electrical conductors from cord wire stock is fully described and disclosed in a copending patent application, Serial No. 190,402, filed April 26, 1962, in the name of Karl H. Andren, wherein a high-speed production machine produces completed cord conductors with great accuracy and range of control, and wherein the multiple conductor cords are produced in predetermined lengths adjustable during operation, and wherein the multiple wire cords are formed from ribbon stock in which the wires are laterally disposed in a common plane and are severed so that the opposite severed ends are presented to diverse tools to perform their operations perpendicular to the plane of the ribbon, and wherein the terminals are fed either laterally or longitudinally toward the wire ends.

A number of different kinds of machines for producing various types of electrical conductors from cord wire stock have heretofore been proposed and used quite extensively. However, as the conductor requirements become more exciting and intricate, the production of conductors of the various types must be produced with precision, and prior apparatus for attaching terminals has been relatively inefficient. In these so-called "electric cords," two or more conductors have plastic insulation molded together laterally, and in order to properly apply terminals of various types, the insulation at the opposite ends of each cord conductor must be slit to separate the individual conductors, and usually the insulation must also be removed at the conductor ends before the terminals can be attached thereto. However, most of the prior art conductor cord producing machines have been restricted to the application of very limited types of terminals only, and only to the attachment of such terminals to one end of each wire or cord, and as the terminals are applied in the same operating zone, the speed of operation and capacity of these machines is limited.

The present invention therefore contemplates the provision of apparatus which obviates the disadvantages attendant prior devices of this general type.

It is therefore another object of this invention to provide improved terminal attaching apparatus for simultaneously attaching a plurality of terminals to the ends of a cord having a plurality of conductors.

It is another object of the invention to provide an improved terminal attaching die unit wherein a plurality of terminal strips are efficiently applied in a terminal attaching zone to a multiple conductor cord.

It is a further object of the invention to provide apparatus for improved conductor orientation for the attachment of a plurality of terminals to a plurality of conductors.

It is another object of this invention to provide an improved attaching means for angularly feeding a plurality of terminals to an attaching zone, and wherein one of said terminals may be applied parallel to the center line of the improved terminal attaching die unit.

It is a further object of this invention to provide improved apparatus for applying a variety of types of terminals to multiple conductor cords in a terminal attaching zone.

It is another object of this invention to provide an improved feeding means for successively advancing a plurality of terminals to a terminal attaching zone.

It is a further object of the invention to provide an improved wire positioning means for more efficient terminal attachment to a plurality of wires.

These and other objects and advantages of the invention will become apparent from the following detailed description.

A clear conception of the several features constituting the present invention and of the mode of constructing and operating a terminal attaching device embodying the improvements may be had by referring to the drawings accompanying and forming a part of this specification, wherein like reference characters designate the same or similar parts in the various views.

While the improvements have been illustrated and described as being especially advantageously embodied in an apparatus for producing electrical conductors from cord wire stock, it is not intended to thereby unnecessarily limit or restrict the invention. It is also contemplated that certain descriptive terminology used herein shall be given the broadest possible interpretation consistent with the disclosure.

Figure 1:
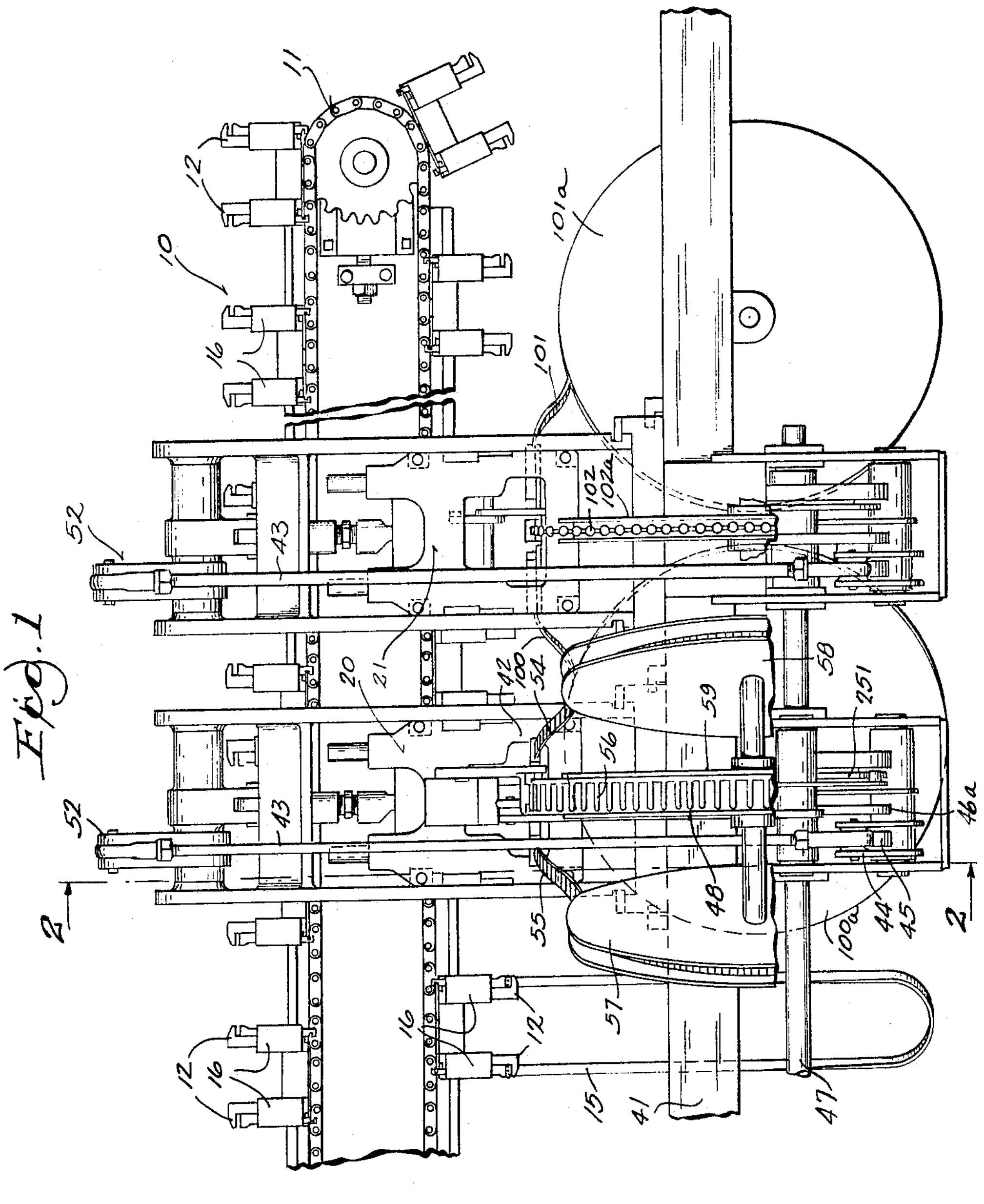
FIGURE 1 is a fragmentary front elevational view of a machine embodying the invention.

Referring now to the drawings, the conductor producing machine 10 of FIGURE 1, as more fully described in the copending Andren patent application, Serial No. 190,-402, filed April 26, 1962, comprises generally a cable or cord conveyor device 11 having operable jaws 12 for holding the length of cord 15 severed in accordance with the apparatus fully described in the above copending patent application. The cord stock is cut to successive predetermined lengths, and these lengths are gripped by jaws 12 and carried by the conveyor device along the machine 10 wherein the ends of the cords are successively slit, stripped, or stagger cut dependent upon the type of terminals to be attached at terminal attaching units 20 and 21. The conveyor is intermittently operable as described in the above copending patent application.

Figures 36, 37, 38, 39, 40:
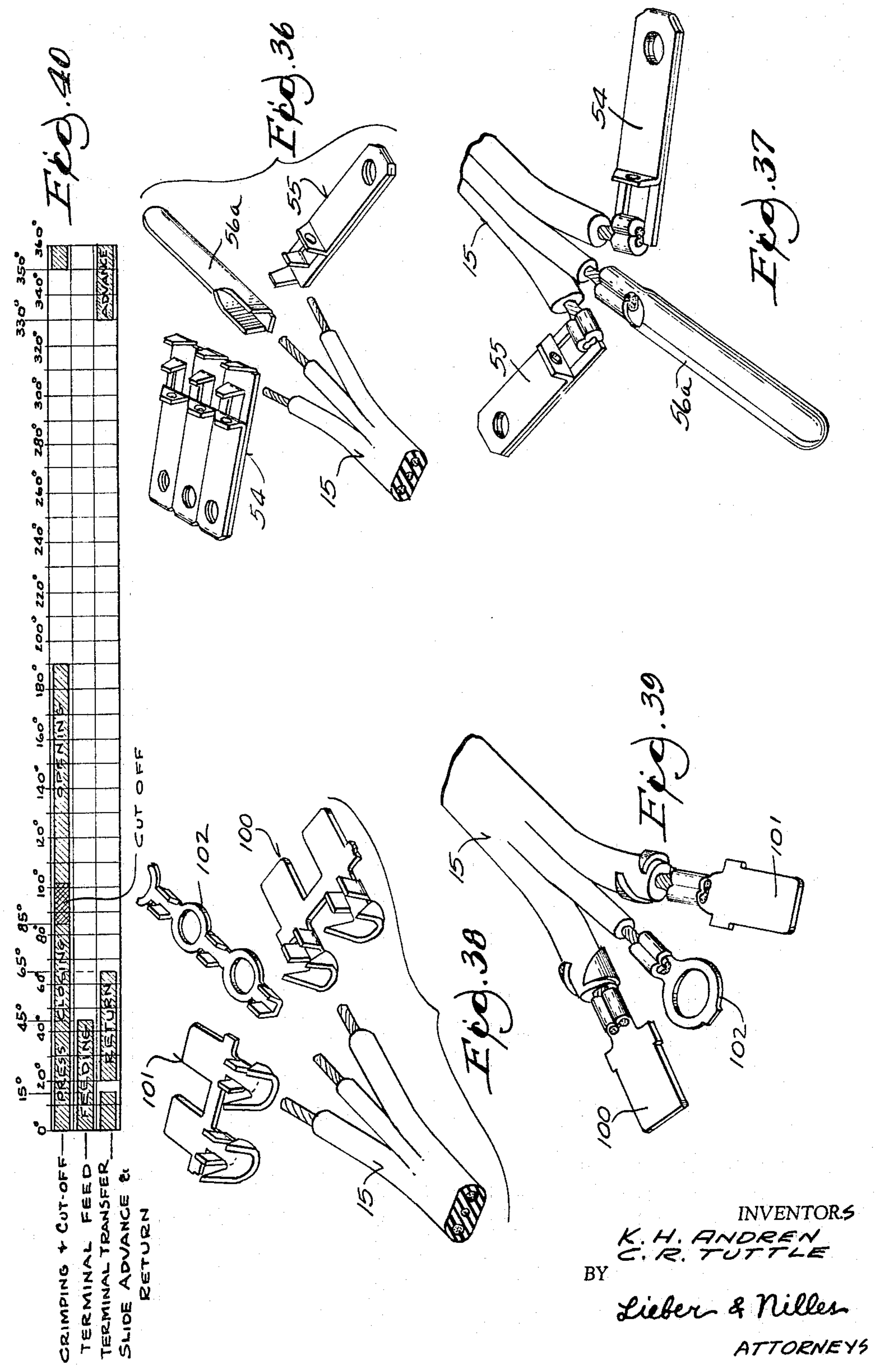
FIGURE 36 is a perspective view of a set of terminals arranged for attachment.
FIGURE 37 is a perspective view of the attached terminals and a fragment of the cord stock.
FIGURE 38 is a perspective view of another form of terminals positioned for attachment.
FIGURE 39 is a perspective view of the terminals of FIGURE 38 in attached condition.
FIGURE 40 is a typical timing diagram for three-conductor parallel cord stock.

When the ends of the cord lengths 15 have been properly slit and the conductors thus separated, the carriers 16 are successively and intermittently advanced by the conveyor 11 through one or more terminal applying mechanisms 20 and 21. The terminal applying mechanisms, to be described in detail hereinafter, are adapted to produce finished electrical conductors of variable length having the ends of the conductors terminated, as shown in FIGURES 37 and 39, for example.

Figures 13, 14, 15:
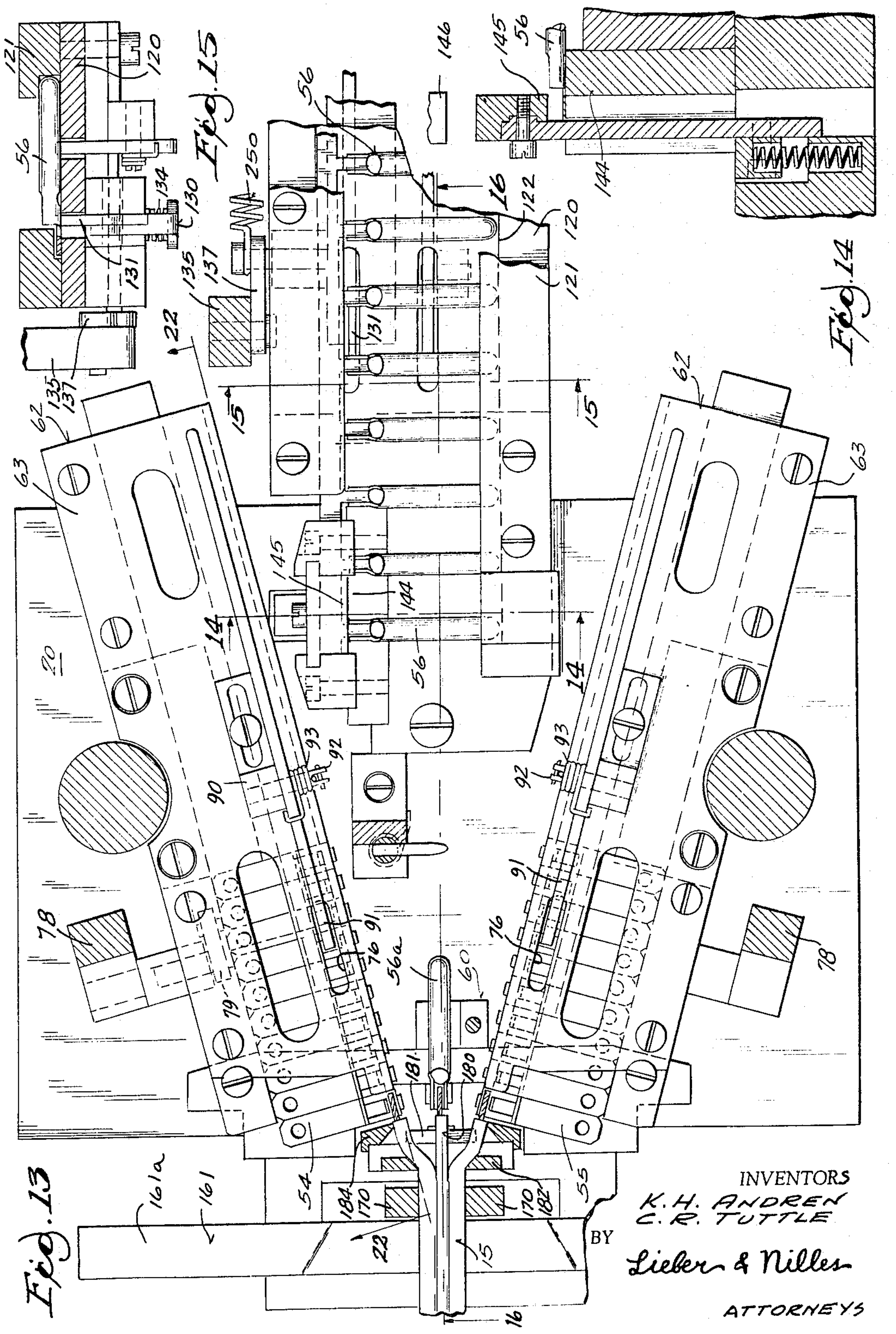
FIGURE 13 is an enlarged view showing the angular feed of terminals as taken along line 13—13 of FIGURE 3.
FIGURE 14 is a sectional view taken along line 14—14 of FIGURE 13.
FIGURE 15 is a sectional view taken along line 15—15 of FIGURE 13.

As depicted in FIGURE 13, the terminal attaching mechanism 20 is adapted to simultaneously attach terminals 54, 55, 56, while other terminals are being attached to its bared wire ends of the other end of a cord 15 by a terminal attaching mechanism 21.

Figure 2:
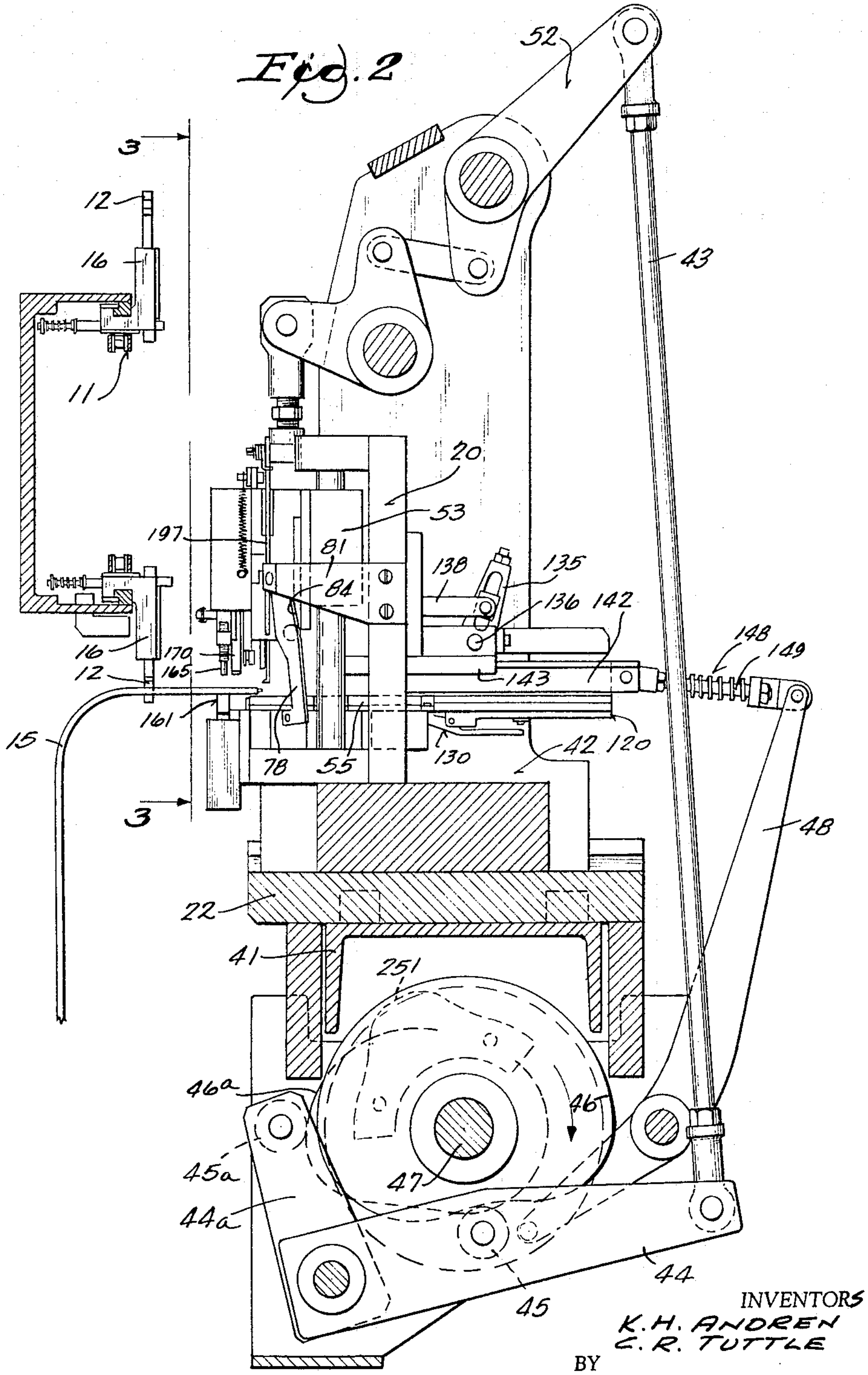
FIGURE 2 is an end elevational view of the machine of FIGURE 1 taken in the direction of the arrows 2—2 of FIGURE 1.

The terminal attaching mechanism 20 comprises in general, as shown in FIGURE 2, a base 22 mounted on a channel 41 and supporting a press 42. The press 42 is operated for terminal attachment by a link assemblage 52 cooperating with a link 43 and a cam lever 44 in turn cooperating with a roller 45 riding on one side of cam 46 mounted on a drive shaft 47, and another cam lever 44A which cooperates with a roller 45A on the side of cam 46A coacts with a reciprocable tool slide 53 carrying the terminal crimping tool.

The successive terminals of terminal strips 54, 55, 56 are fed from supply reels 57, 58, and 59 (FIGURE 1) respectively in prefabricated strip form. The terminals 54, 55 are shown in the preferred embodiment as male blades, and the terminal 56 applied to the center conductor, as herein described and shown, is a ground lead pin (FIGURE 13).

All three terminal strips are fed toward the terminal attaching zone in terminal attaching mechanism 20 in substantially the same horizontal plane (FIGURE 1). As can be seen in FIGURE 13, the terminals 54, 55 are fed to the terminal attaching zone at 15° to the center line of terminal 56 as will be described in greater detail hereinafter.

The center ground pin terminal strip 56 is fed toward the terminal attaching zone. In order that the ground pin is properly presented to the bared wire, it is necessary to cut one terminal **56*a* at a time from the continuous terminal strip 56 at a predetermined distance from the attaching zone. The terminal strip 56 is gripped and carried to the terminal attaching zone by a transfer device 60, which rotates the terminal 56*a*** through an angle of 90° for proper presentation of the terminal to the center wire of the through wire cord, as will be described in greater detail hereinafter.

A detailed description will now be made of the terminals 54, 55 and their attachment in the attaching zone of terminal attaching mechanism 20. As the mechanism for the feeding and the crimping terminals 54, 55 are identical, only one of the mechanisms will be described.

The terminal strip supply reels 57, 58 are shown mounted for rotation for supplying terminals in strip form to the terminal attaching zone of terminal attaching mechanism 20. In the embodiment shown in FIG. 13, blade type terminals 54, 55 are fed to the terminal attaching zone in timed relation to the operation of the terminal attaching mechanism 20 and conveyor 11 as it carries the through conductor cord to the terminal attaching zone and wherein said conductors of said cord 15 have already been cut and stripped as hereinafter described. Also, the separate conductors are arranged and presented for terminal attachment thereto by a conductor spreader mechanism 70 to be described in greater detail hereinafter.

Figures 22, 23:
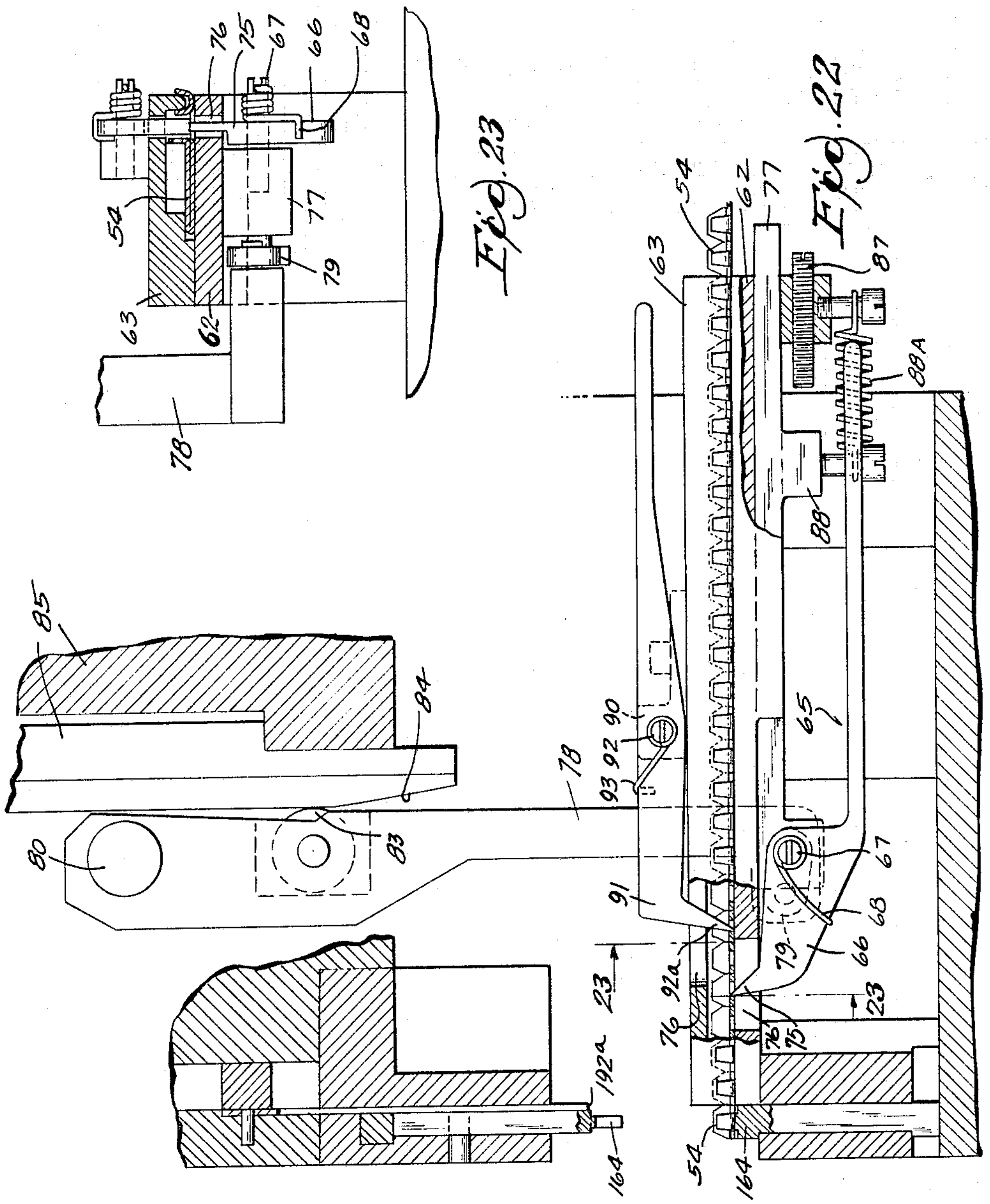
FIGURE 22 is an elevational view of the angular terminal feed taken along line 22—22 of FIGURE 13.
FIGURE 23 is a fragmentary sectional view taken along line 23—23 of FIGURE 22.

Specifically, the blade terminals from the supply reels 57, 58 are guided and confined within terminal strip guides 62 (FIGURE 23) and terminal strip guide covers 63. With the terminal strips so oriented in the strip guides, the terminals are successively presented for terminal attachment by being advanced along guide 62 by terminal feed pawl assembly 65 (FIGURE 22). A feed pawl 66 is pivotally mounted on a pin 67 on which are mounted torsion springs 68 to urge the tip 75 of the feed pawl into contact with the terminal strip through a slot 76 in the terminal guide 63.

The pivot pin 67 is secured on a terminal feed slide 77. The slide 77 is actuated in timed relation to the operation of the terminal attaching unit 20 to move forward to the terminal attaching zone and away therefrom. The longitudinal movement imparted to the slide 77 is slightly in excess of the pitch of the terminals forming the terminal strip to successively present the terminals for attachment to the conductors of the cord 15.

Figures 3, 5:
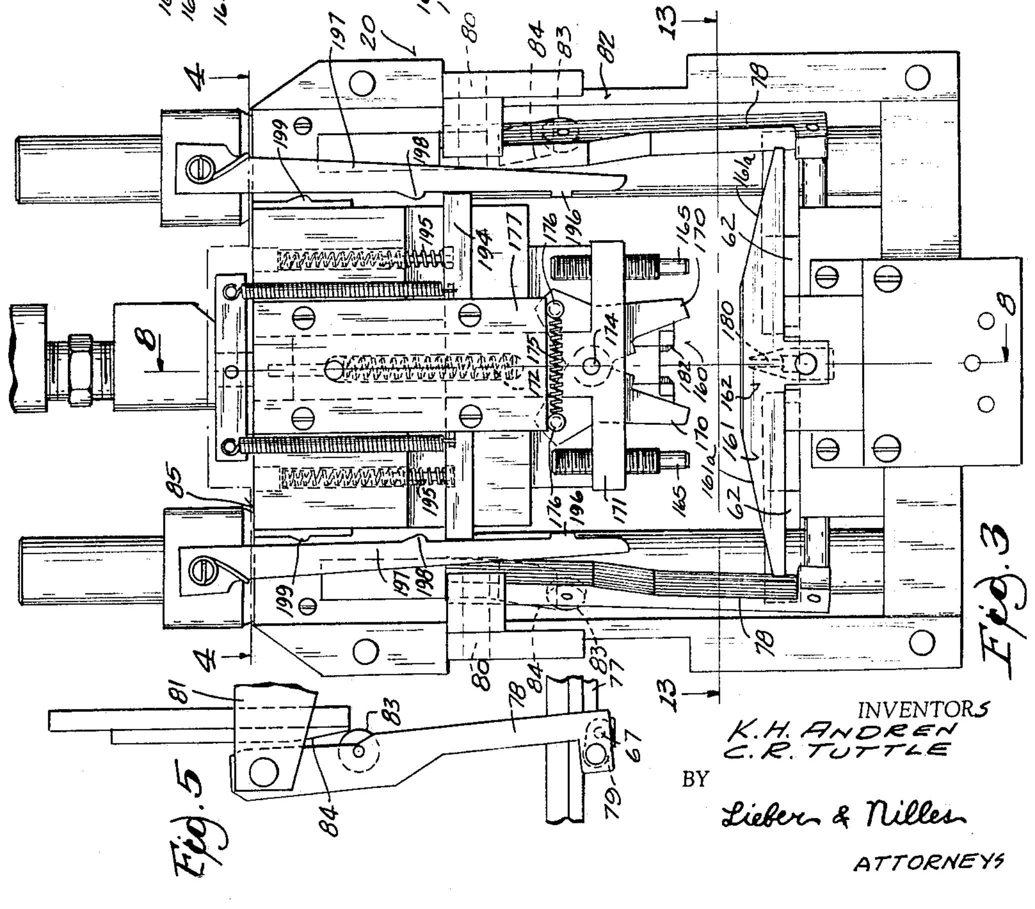
FIGURE 3 is an enlarged elevational view of the terminal attaching unit of the machine of FIGURE 1 taken in the direction of the arrows 3—3 of FIGURE 2.
FIGURE 5 is an enlarged view taken in the direction of the arrows 5—5 of FIGURE 4.

Reference to FIGURES 5 and 22 discloses that the back and forth motion of the terminal feed slide 77 is produced or transmitted thereto by the motion of terminal feed lever 78 and link 79, which is attached to the pin 67. The terminal feed lever 78 pivots as at pin 80 secured within bracket 81. The bracket is carried by the main terminal die frame 82. The feed lever 78 is provided with a cam roller 83 which engages and travels over a cam surface 84, which moves upwardly and downwardly, as viewed in the drawings, with tool slide 85. As the tool slide 85 moves downwardly, the cam roller will tend to climb an inclined cam surface 84 to actuate the terminal feed lever 78 to position terminal feed slide 77 and pawl assembly 65 toward the terminal attaching zone to thereby present a blade terminal 54 for subsequent attachment to a conductor of cord 15. The final position of the terminal feed slide is determined by the position of the cam 83 on the surface 84.

As the tool slide 85 moves upwardly, the terminal feed slide 77 and pawl assembly 65 retract from the attaching zone by the urging of a spring 88A (FIGURE 22). The retracted position of the feed slide 77 is determined and limited by the adjustment of a screw 87 as it is set to strike a flange 88 on the terminal feed slide (FIGURE 22).

A stop pawl bracket 90 mounted on the terminal guide cover 63 carries a stop pawl 91 on a pin 92. The tip 91*a* of pawl 91 is urged against the terminal strip through a slot 76 by a torsion spring 93. The stop pawl 91 prevents the terminal strip from moving as the feed pawl 66 retracts to reposition itself for the next terminal feed motion. This is accomplished by the tip 91*a* snapping into a slot in the terminal strip immediately prior to the completion of the forward feed of the terminal strip. Thus, a means has been described for feeding terminals from terminal strips toward the terminal attaching zone from the terminal strip supply reels 57 and 58.

Figure 4:
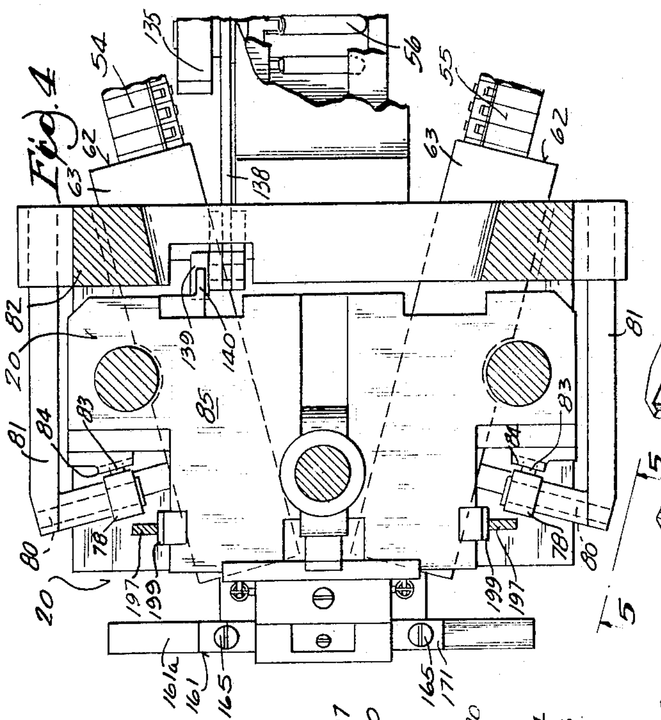
FIGURE 4 is an enlarged sectional view of the die of FIGURE 3 taken along line 4—4 of FIGURE 3.
Figures 6, 7:
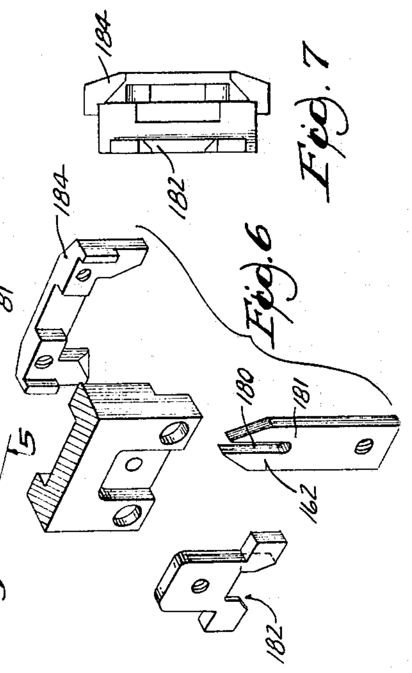
FIGURE 6 is an exploded view in perspective of the conductor locating means of FIGURE 3.
FIGURE 7 is an assembled plan view of the components of FIGURE 6.

It should be noted that in the embodiment of FIGURE 4, the terminal strips 54, 55 are fed to the attaching zone at an angle of 15° with a center line passing through the terminal strip 56. By orienting the terminals of the terminal strips in this manner, the terminals are presented to the conductors of the cord in a convenient manner for terminal attachment. It is sufficient to note, however, that the conductors are spread a predetermined amount to facilitate such terminal attachment at the open ears of the terminals.

Figures 26, 33, 34, 35:
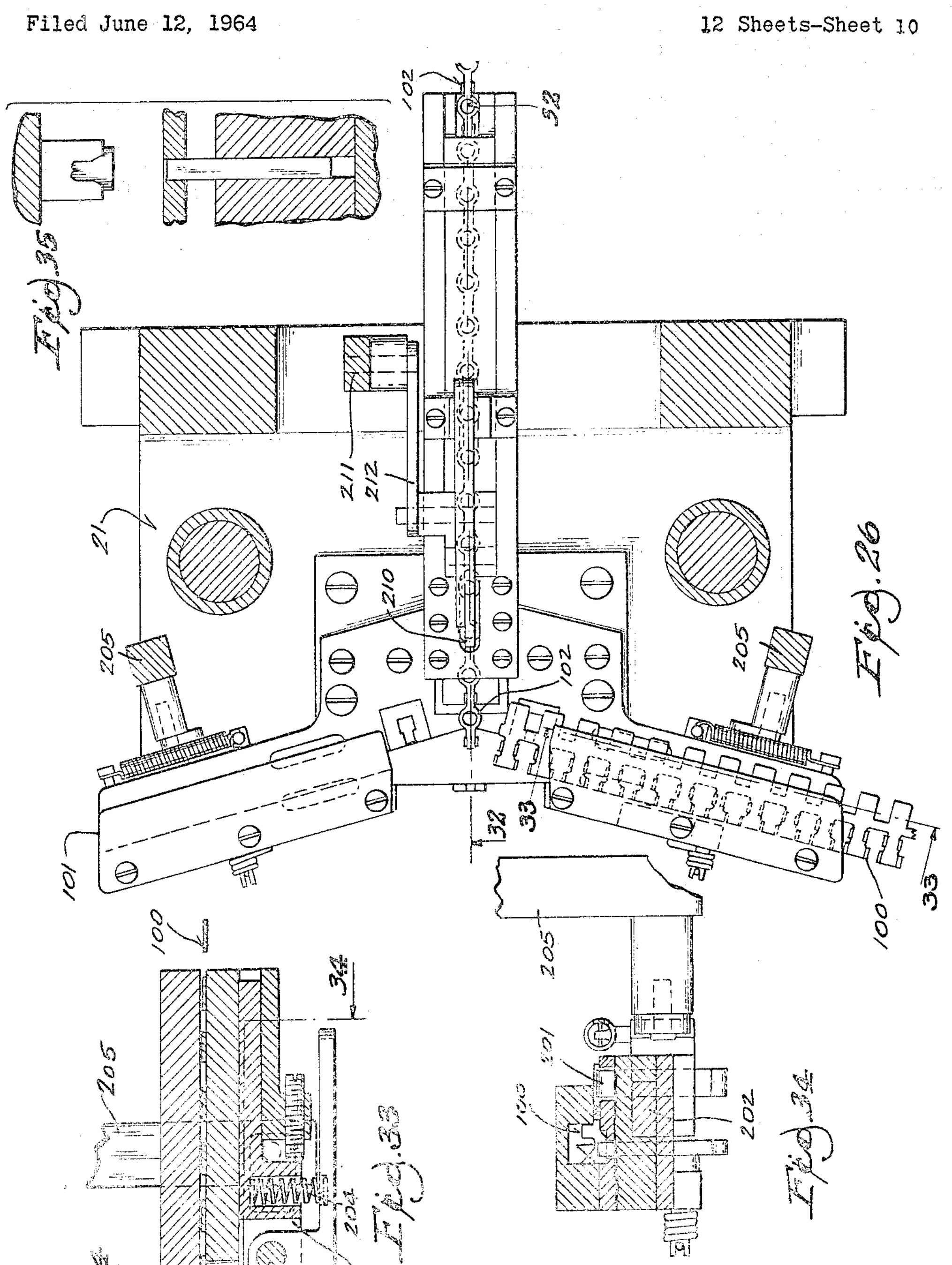
FIGURE 26 is a view taken along line 26—26 of FIGURE 24.
FIGURE 33 is an enlarged sectional view taken along line 33—33 of FIGURE 26.
FIGURE 34 is a sectional view taken along the irregular line 34—34 of FIGURE 33.
FIGURE 35 is a fragmentary view taken along line 35—35 of FIGURE 32.

In another embodiment, as shown in FIGURE 26, the terminal strips 100, 101 are fed into the terminal attaching zone at an angle of 105° with a center line passing through the center terminal strip 102. The terminal strips 100, 101 are fed to the terminal attaching zone as hereinbefore described in conjunction with terminal strips 54, 55, except that the cam surfaces 111, 112 (FIGURE 5) are oriented in a different plane by reason of the 105° feed.

Also, it should be noted that with the end-to-end terminals of the embodiment of FIGURE 26, it is not necessary to provide a means for rotating the terminal 90° prior to attachment to the central conductor of the three-conductor cord.

Thus, it can be stated that apparatus has been devised to accommodate a variety of terminals for efficiently attaching these terminals to a plurality of conductors of a multiple conductor cord simultaneously. For example, reference is made to FIGURES 36 and 38 that illustrate some of the many types of terminals that are available in strip form, which can be applied simultaneously to three-conductor cords. It should be noted that for the ears of the terminals of FIGURE 36 to be properly presented for attachment to the bared conductors that the terminal strips are aligned to form a 15° angle with a center line passing through the center terminal, and in FIGURE 38, the terminal strips are oriented to form a 105° angle with the center line. If all the terminals were as terminal 102 and arranged in an end-to-end relationship, then it would be possible to align them for substantially parallel presentation to the terminal attaching zone. Or, if terminal 102 was used in conjunction with terminals 54, 55, it is not necessary to rotate the terminal 102 through 90° as is necessary with terminal 56*a* as disclosed in FIGURE 13.

It should also be noted that the terminal attaching units may be constructed and operated apart from the machine of FIGURE 1 as individual bench units where the multiple conductor cords cut to a predetermined length and the terminals are attached simultaneously thereto by manual operation of the terminal attaching mechanism. When the terminal attaching mechanism or mechanisms are part of the machine of FIGURE 1, then the multiple conductor cords are produced by having the terminals attached simultaneously in timed relation with operation of the machine and components thereof.

Figures 16, 19:
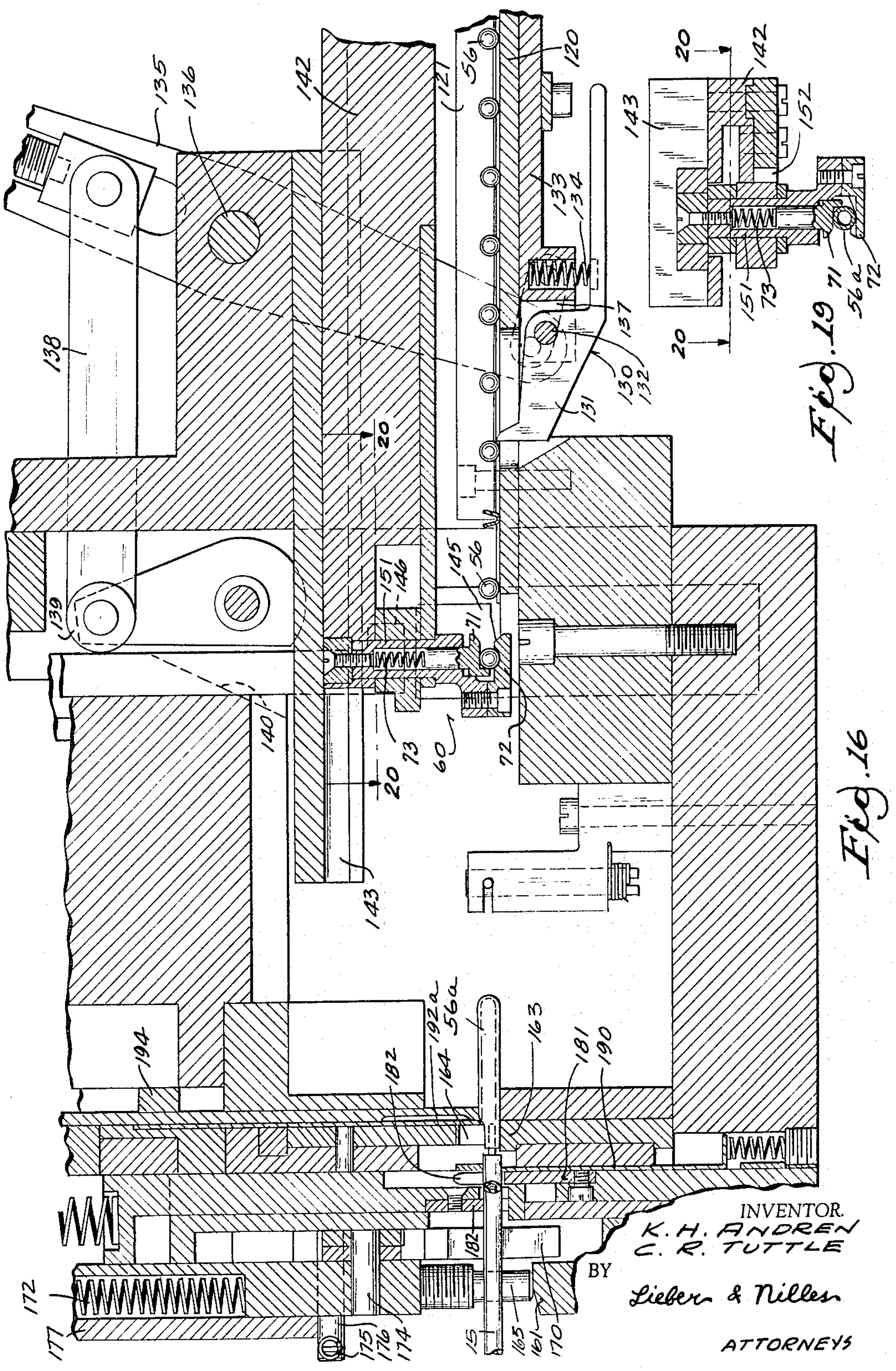
FIGURE 16 is a sectional view of the center terminal feed taken along line 16—16 of FIGURE 13.
FIGURE 19 is a sectional view taken along line 19—19 of FIGURE 17.

Reference will now be made to FIGURE 16 for a description of the center terminal strip feed mechanism for the terminal attachment of terminal 56*a* to the center conductor of a through conductor cord. The terminal strip 56 comprises a plurality of ground pin terminals 56*a* disposed in a side-by-side relation as shown in FIGURE 13. The terminal strip 56 is fed from a supply reel 59 and is guided and confined within a terminal strip guide 120 and terminal guide covers 121. When the terminal strip 56 is inserted into the track 122, the successive terminals are fed toward the terminal attaching zone of terminal attaching mechanism 20 by a feed pawl assembly 130 having a feed pawl 131 pivotally mounted on a pin 132 carried by a terminal feed slide 133. A spring 134 mounted in slide 133 urges the feed pawl assembly 130 into a position relative to the terminals 56*a* of the strip for feeding the terminals of the terminal strip toward the terminal attaching zone. A forward and reverse motion is imparted to the terminal feed slide 133 by a lever 135 pivotally mounted as at pin 136, wherein the lever 135 is connected to the feed slide by a link 137. The lever 135 is connected to a feed link 138 having a cam roller 139 engageable with a cam surface 140 fastened to the tool slide and movable therewith. In fact, as hereinabove described, the movement of the tool slide also positions a cam surface for the feeding of terminal strips 54 and 55, so that there is simultaneous feeding of the three terminal strips toward the terminal attaching zone of the terminal attaching mechanism 20.

As the tool slide is positioned downwardly, the cam roller 139 moves over the inclined cam surface 140 to actuate the linkages 138, 135, 137, and feed pawl 131 to advance the terminal strip toward the terminal attaching zone.

The terminal feed slide 133 with feed pawl 131 attached thereto retracts from the terminal attaching zone by the urging of spring 250 as the tool slide 53 retracts (FIGURE 13). Thus, an initial description has been made of a means for feeding the ground pin terminals 56*a* in substantially alignment with the center line passing through the terminal attaching unit 20.

Figures 17, 18, 20, 21:
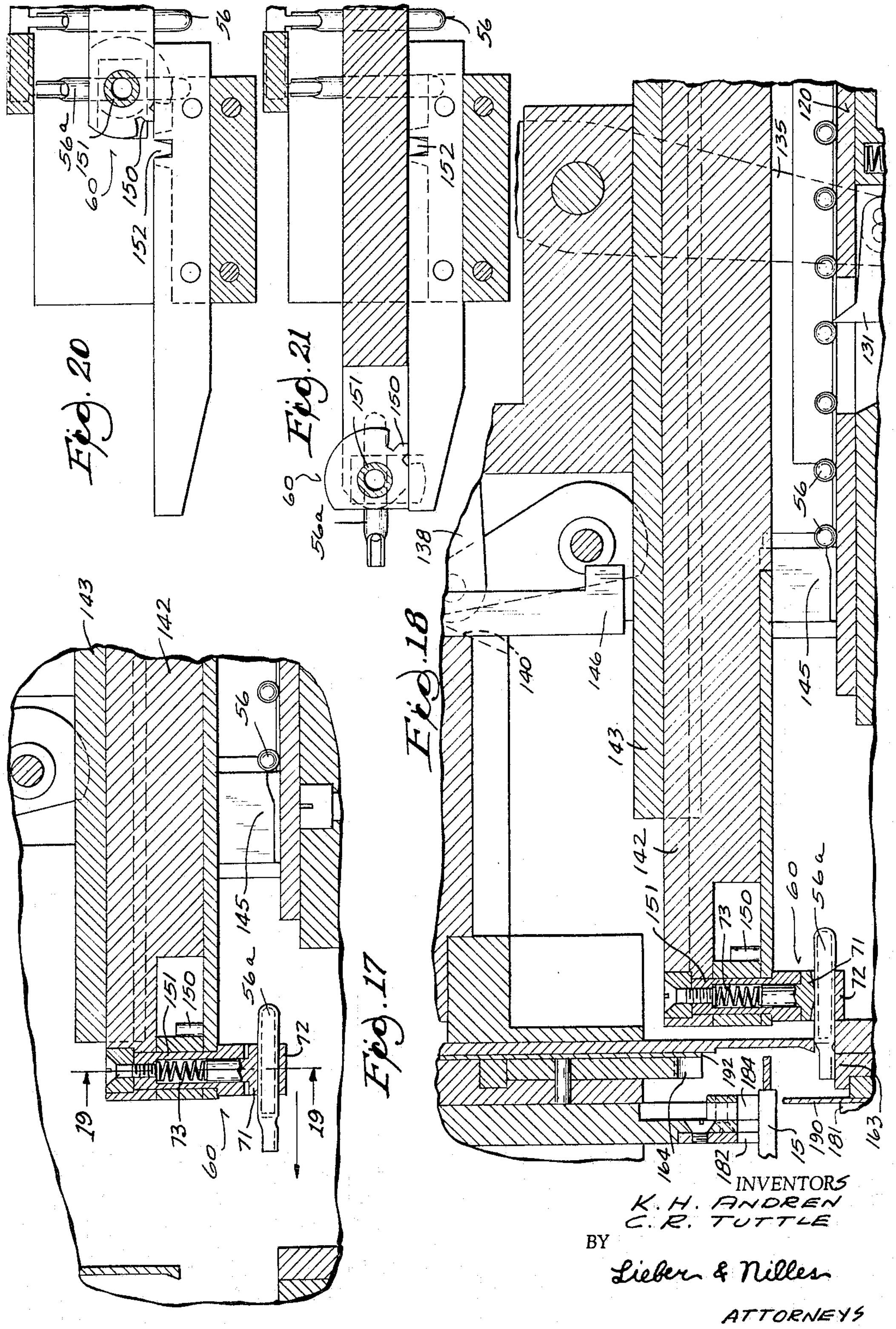
FIGURE 17 is a fragmentary sectional view of the terminal holding and transfer mechanism of FIGURE 16 in an intermediate position.
FIGURE 18 is another fragmentary sectional view of the terminal holding and transfer mechanism of FIGURE 16 in a different position.
FIGURE 20 is a fragmentary plan view taken along line 20—20 of FIGURE 16.
FIGURE 21 is a plan view similar to that of FIGURE 20 showing another position of terminal holding and transfer mechanism.

The ground pin terminals 56*a* are secured one to the other in a side-by-side relation in the terminal strip 56, and it is necessary to sever each pin terminal prior to its terminal attachment. Also, in order that the ears of the pin terminal 56*a* be properly aligned with a conductor presented at the terminal attaching zone, the pin terminal 56*a* is rotated through 90° as it is advance toward the terminal attaching zone. Reference is made to FIGURE 16 wherein a terminal transfer mechanism 60 is disclosed for rotating the pin terminal through a 90° angle. A terminal transfer slide 142 (FIGURE 17) is carried for reciprocal movement in a stationary housing 143. The pin terminal 56*a* to be advanced and transferred to the terminal attaching zone is secured between a rigid jaw member 72 and a spring loaded jaw member 71 wherein the jaws are urged together by a spring 73. The jaws 71 and 72 are beveled in a front portion thereof, and the pin terminal 56*a* is gripped by the spring action of the jaws against the terminal at the beveled portion. The spring loaded jaw 71 is forced upwardly to snap the terminal into place between the jaws.

The severance of the pin terminal from the terminal strip occurs during the last portion of the downward stroke of the terminal die unit. Specifically, the terminal connection bar is severed against cut-off die 144 by means of a cut-off blade 145. The cut-off portion of the terminal strip is forced downwardly into the cut-off die to fall therefrom. The downward motion of the cut-off blade 145 is provided by a striker bar 146 bolted to the tool slide striking the top of the cut-off blade.

The reciprocating motion is transmitted to the terminal transfer slide 142 through an adjustable connecting link assembly 148. The connecting link 149 is connected to a lever 48 which receives its oscillatory motion from a cam means 251 (FIGURE 2).

As the transfer slide 142 is moved toward the terminal attaching zone in timed relation to shaft 47, a gear segment 150 attached as the pivot shaft 151 engages a stationary rack 152 to pivot the shaft 151 and transfer jaws 71 and 72 through an angle of 90° to orient the pin terminal **56*a* in substantial alignment with the center line of the terminal attaching unit 20 to receive the center conductor of the three-wire cord 15**.

Thus, a means has been provided for the terminal attaching unit 20 for feeding, severing, and transferring the ground pin terminal in a properly oriented manner for terminal attachment. It should be mentioned that the particular form of the pin terminal requires the angular transfer motion to properly present the terminal to the conductor; however, other terminals as shown in FIGURE 38 do not require the angular rotation thereof and in such event the transfer slide rack 142 and pivot shaft 151 may be eliminated from the terminal feed means for the center conductor of a three-wire cord.

Figures 8, 9, 10, 11, 12:
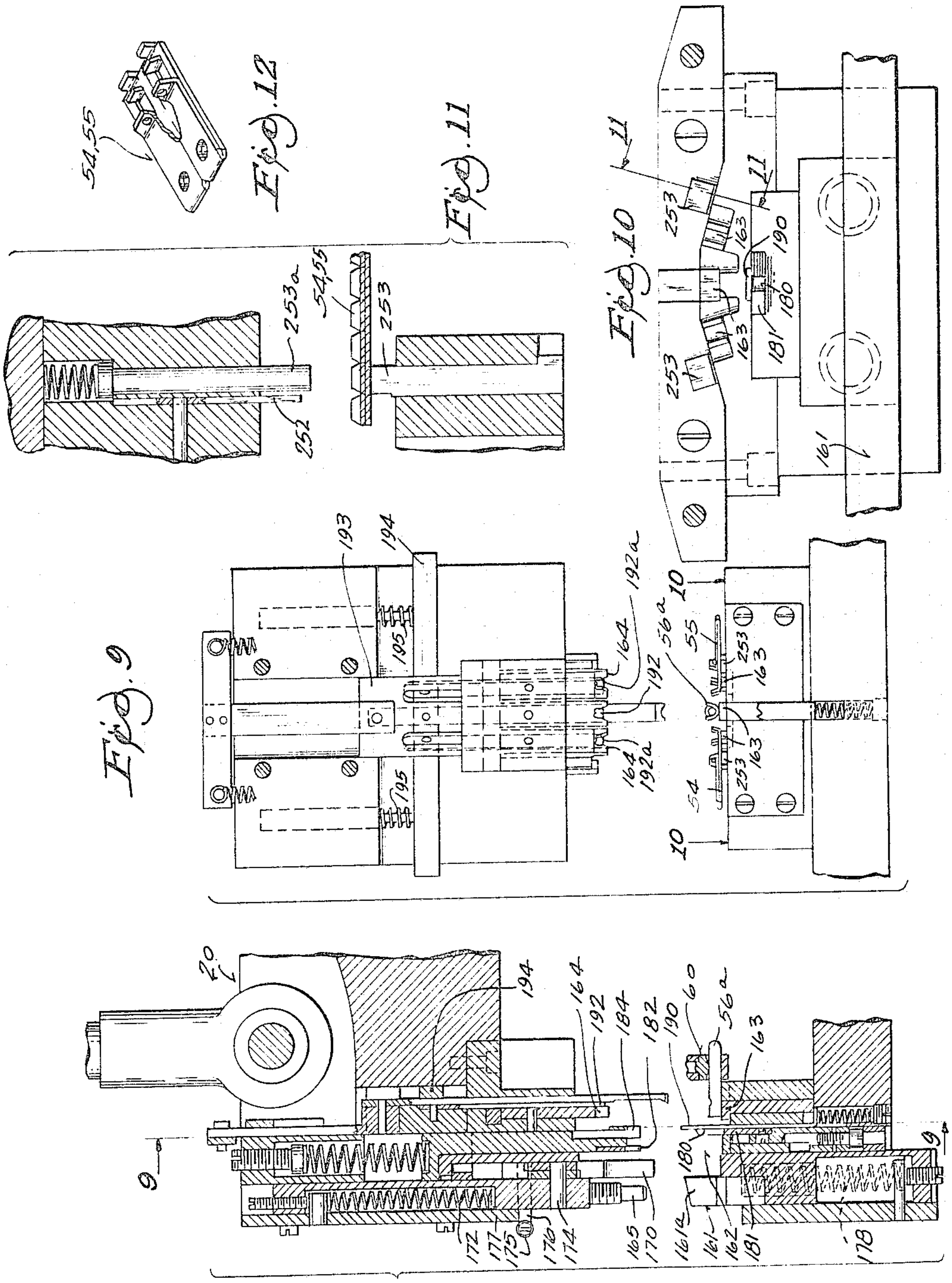
FIGURE 8 is an enlarged section taken along line 8—8 of FIGURE 3.
FIGURE 9 is an elevational view taken along line 9—9 of FIGURE 8.
FIGURE 10 is an enlarged plan view taken along line 10—10 of FIGURE 9.
FIGURE 11 is a sectional view taken along line 11—11 of FIGURE 10.
FIGURE 12 is a perspective view of a set of typical terminals to be applied in the machine of FIGURE 1.

Reference is now made to FIGURES 3, 8, and 13 wherein a means for locating each of the three conductors of the cord 15 for terminal attachment thereto is shown. A conductor spreader device 162 provided with a wire ramp 161 is bolted to the terminal attaching die unit frame immediately adjacent the die unit anvils 163. A wire positioning device 160 is shown secured to the tool slide immediately adjacent the clinching dies 164. As the cord 15 is moved laterally along the machine by conveyor 11 into the terminal attaching zone, the ends of the cord will engage and travel along the inclined surface **161*a* of the wire ramp 161**. The ramp enables the conductors to be carried over the terminals so that they will not catch or otherwise interfere with the terminal ears (FIGURE 8).

As the tool slide is actuated to move toward the anvils 163, the entire wire positioning device 160 moves with the tool slide. This positioning results in a contact between thrust pins 165 and wire ramp 161 to secure the wire between the ramp 161 and open wire positioning fingers 170. A continued downward movement of the tool slide will position finger slide 171 against the urging of spring 172. The two positioning fingers 170 pivot about a pin 174, and they are urged toward an open position by a spring 175. The amount that the fingers 170 are open is restricted by the location of pin 176 engaging cover 177.

Thus, when finger slide 171 and pivot pin 174 are retracted, the positioning fingers 170 close on the conductor 15 and center it between the fingers. Once the conductor has been secured in this manner, no further release movement of the parts within the wire positioning assembly can occur.

Further downward motion of the tool slide results in the engagement of the thrust pins against the wire ramp 161 to urge the ramp downward against the springs 178. This downward action accomplishes two things:

First, the conductors are thereby lowered to the level of the terminals to be applied, and Secondly, as the conductors are lowered, the center conductor will be forced into a slot 180 of wire spreader blade 181, and the two outside conductors will be forced outside the slot to spread the conductors to align them with the presentation of the terminals in the terminal attaching zone as hereinabove described.

When the conductors are split or separated at the end of the cord 15, it is important that the splitting does not exceed a predetermined distance from the end of the cord and therefore a wire centering plate 182 is, utilized. The wire centering plate 182 is, in the preferred embodiment, a U-shaped member having an opening the same width as the lateral extent of the cord 15. The plate 182 will close over the cord and thus prevent the conductors from being split or torn away beyond the plate. Further, a wire positioning plate 184 is provided having a U-shaped member which prevents the outer conductors from being spread apart to a larger degree than is required by the location of the ears of the outer terminals.

With the conductors of the cord properly positioned within the ears of the terminals, the terminal die continues its downward motion to clinch the terminal ears around the ends of the positioned conductors.

At the end of the downward motion to clinch the terminals, the terminal 55 is sheared away from the strip of terminals by means of a cut-off blade 252 in the clinching die section shearing against cut-off block 253 in the stationary anvil section (FIGURE 11). The spring-loaded plunger **253*a*** clamps the terminal strip against the cut-off block during this operation.

After the terminals have been clinched on the conductors, the terminal die unit opens and a spring-loaded wire "knock-out" blade 190 engages with the center conductor to eject it from the slot 180 in the wire spreader blade 181.

Reference will now be made to the time sequence chart (FIGURE 40) setting out the sequence of operations as they occur during a complete terminal attaching cycle of the terminal attaching unit.

At 330° on the timing diagram, the terminal die unit press is indicated as being dwelling in an open position. The terminal transfer slide is in a retracted position holding a terminal that has been severed from a terminal strip so the transfer slide is initiating its advance toward the terminal attaching zone, and after a slide advance of approximately ¼", the gear segment of the transfer slide engages to the rack and a 90° rotation of the terminal occurs.

At 350°, the terminal attaching press begins to close, and all three of the terminal strips are being fed toward the terminal attaching zone as the feeding motion of all of the terminals is derived from the closing motion of the terminal die unit.

At 15°, the terminal transfer slide has terminated its advance movement, and the spring-loaded terminal blade will engage the terminal and clamp it against the die shoe. Immediately, the transfer slide returns to a terminal pick-up position, and at 45°, the terminal feed is considered complete.

At 65°, the terminal transfer slide returns gripping another terminal for the attachment to the center conductor in the terminal attaching zone. The terminal press at this time is still closing, and the conductor is located in the press as hereinabove described.

At 85°, the terminal clinching dies begin to fold the terminal ears around the conductor. As the clinching dies are now holding the terminals, the severing of the blade terminals from the terminal strip now takes place.

Before the blade terminals can be sheared, the terminal strip is clamped by a spring-loaded hold-down pin to prevent movement of the strip. The cut-off of the pin terminal takes place during the last portion of the downward stroke of the tool slide.

At 120°, the clinching of the terminals is considered complete and the die unit again opens.

As the die unit opens after clinching, there is a possibility that the clinched terminals may stick or adhere to the clinching dies. For this reason, a positive terminal "knock-out" system is employed as shown in FIGURE 8.

Blade terminal knock-outs 192A and a pin terminal knock-out 192 are all secured to a knock-out slide 193. A cross-bar 194 is secured to slide 193 and is urged downwardly by compression springs 195. Thus, the knock-out blades are forced beyond the lower portion of the crimping dies a distance of approximately ¼ inch. When the die unit closes, the knock-out blades also force the conductors down into the open ears of the terminals before the terminals are crimped.

As the terminal crimping die opens, the cross-bar 194 is below the raised portion 196 (FIGURE 3) on the two knock-out trip pawls 197. If the terminals tend to stick, the cross-bar 194 will engage the trip pawls 197 at raised portions 196 to release them.

As the die unit continues to open, the entire knock-out assembly remains stationary, and the knock-out blades are forced beyond the lower portion of the clinching die to positively "knock" the terminals away. The trip pawls 197 are swung out of the way as they lose engagement with cross-bar 194. This is caused by the raised portion 198 engaging trip cam 199.

When the die unit is completely open, the entire device remains stationary until the completed cord is removed and the successive set of conductors are positioned on the wire ramp.

Thus, a complete cycle of terminal attachment of a plurality of terminals to a like plurality of conductors of an electric cord has been described.

In the machine of FIGURE 1, one end of the cord has terminals applied thereto, and the terminals are applied to the other end of the cord at another terminal attaching unit. The conveyor 14, as described hereinabove, transports the cord from terminal attaching device to another. The same type of terminals may be applied to each end of a cord, or different types may be attached at each end. However, a single end of a multiple conductor cord simultaneously receives a plurality of terminal attachments in a single terminal attaching unit. Such attaching unit may be part of a machine as disclosed in FIGURE 1, or the terminal attaching device may be of separate construction so that it is operated on a bench or the like, wherein the conductors and the terminals to be applied thereto are fed to the device by hand.

Reference is now made to the terminal attaching mechanism 21 wherein terminal strips 100 and 101 are fed to the terminal attaching mechanism from supply reels 100*a* and 101*a* respectively, and the terminal strip 102 is fed from supply reel 102*a*. The terminals of strips 100, 101, and 102 are disclosed in FIGURE 38 prior to attachment to a multiple conductor cord 15, and in FIGURE 39, the terminals are shown in their attached condition on cord 15.

Figure 25:
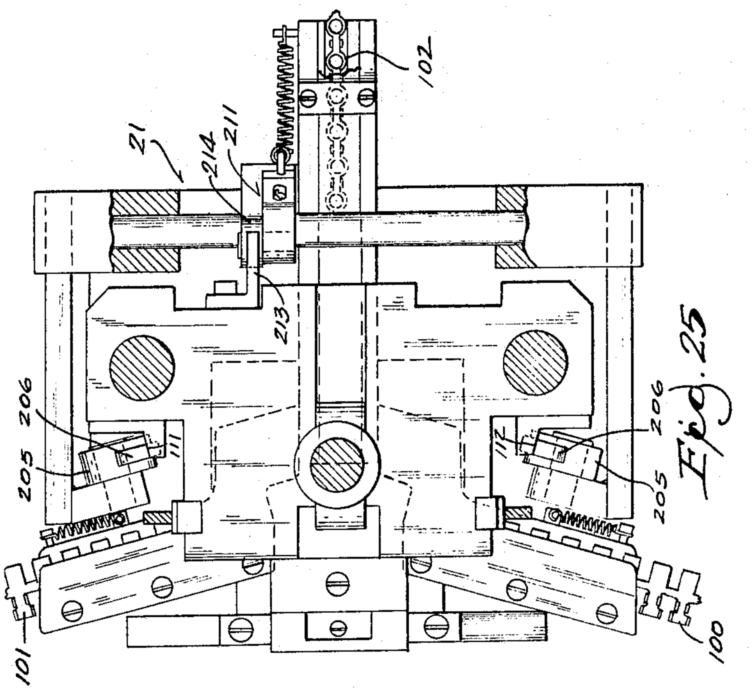
FIGURE 25 is a plan view of another terminal attaching device embodying the invention.
Figure 24:
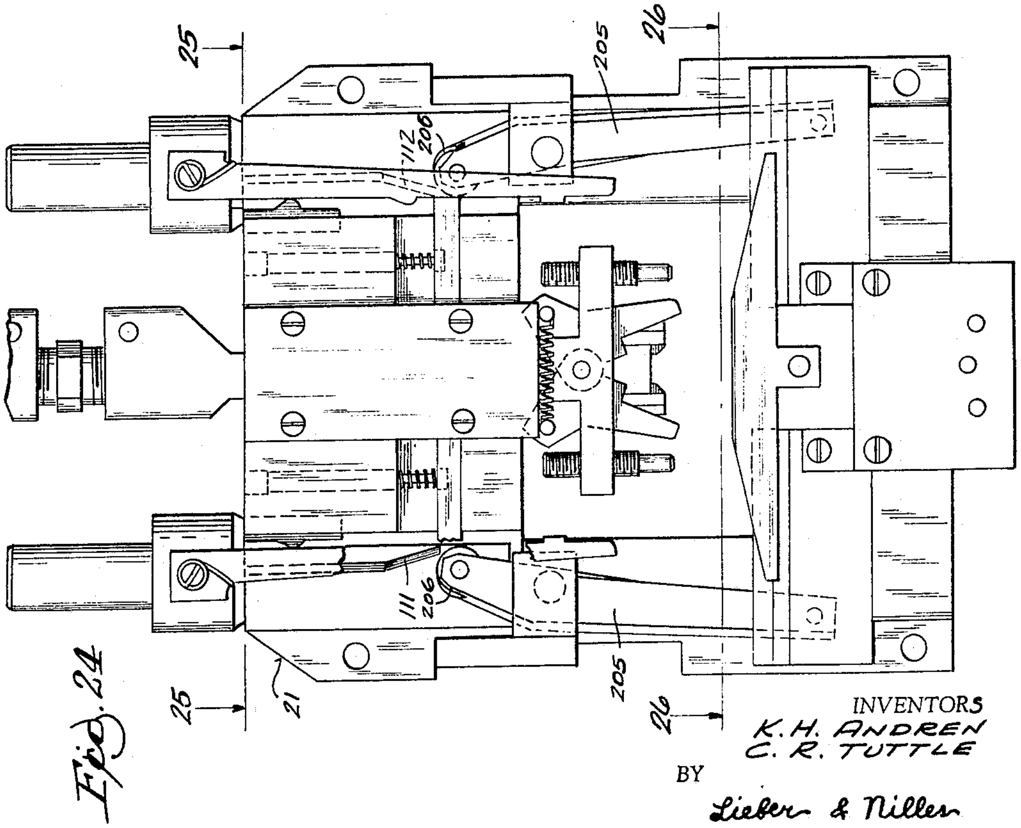
FIGURE 24 is an elevational view taken in the direction of the arrows 24—24 of FIGURE 4.

In FIGURE 26, the terminal strips 100 and 101 are fed to the terminal attaching zone of mechanism 21 at an angle of 105° with a center line passing through terminal strip 102. The feed for strips 100 and 101 is disclosed in FIGURES 33 and 34, and is basically the same as the feed already described in conjunction with terminal strips 54 and 55. A feed pawl 201 is pivotally mounted on a slide member 202 as at pin 203. A spring 204 urges the feed pawl into operative relationship to the terminal strip 100 and 101. Actuation of the pawl 201 is occasioned by a link 205 (FIGURE 25) provided with a cam roller 206 for engagement with cam surface 111 carried by the tool slide of terminal attaching mechanism 21 (FIGURE 25). As the feed pawl 201 is actuated by link 205, the terminals 100 and 101 are advanced simultaneuosly to the terminal attaching zone.

Also, the terminal strip 102 is advanced as by feed pawl 210 as actuated by linkage 211, 212 in timed relation to the positioning of cam surface 213 carried on the terminal attaching mechanism 21. A cam roller 214 in engaging cam surface 213 causes link 211 to pivot about a pin 215 to successively advance terminal strip 102 toward the terminal attaching zone in timed relation to the advancement of terminal strips 100 and 101, as the actuation for the feed pawls 201 and 210 is dependent upon the actuation of the terminal press. A stop pawl 220 is pivotally mounted on a pin 221 and pawl bracket 222. A torsion spring 223 urges the pawl 220 into operating position.

The positioning and spreading of the conductors are accomplished in the same manner as described for die unit 20. Likewise, the clinching of the terminals to the conductors is accomplished in the manner previously described.

Figures 30, 31, 32:
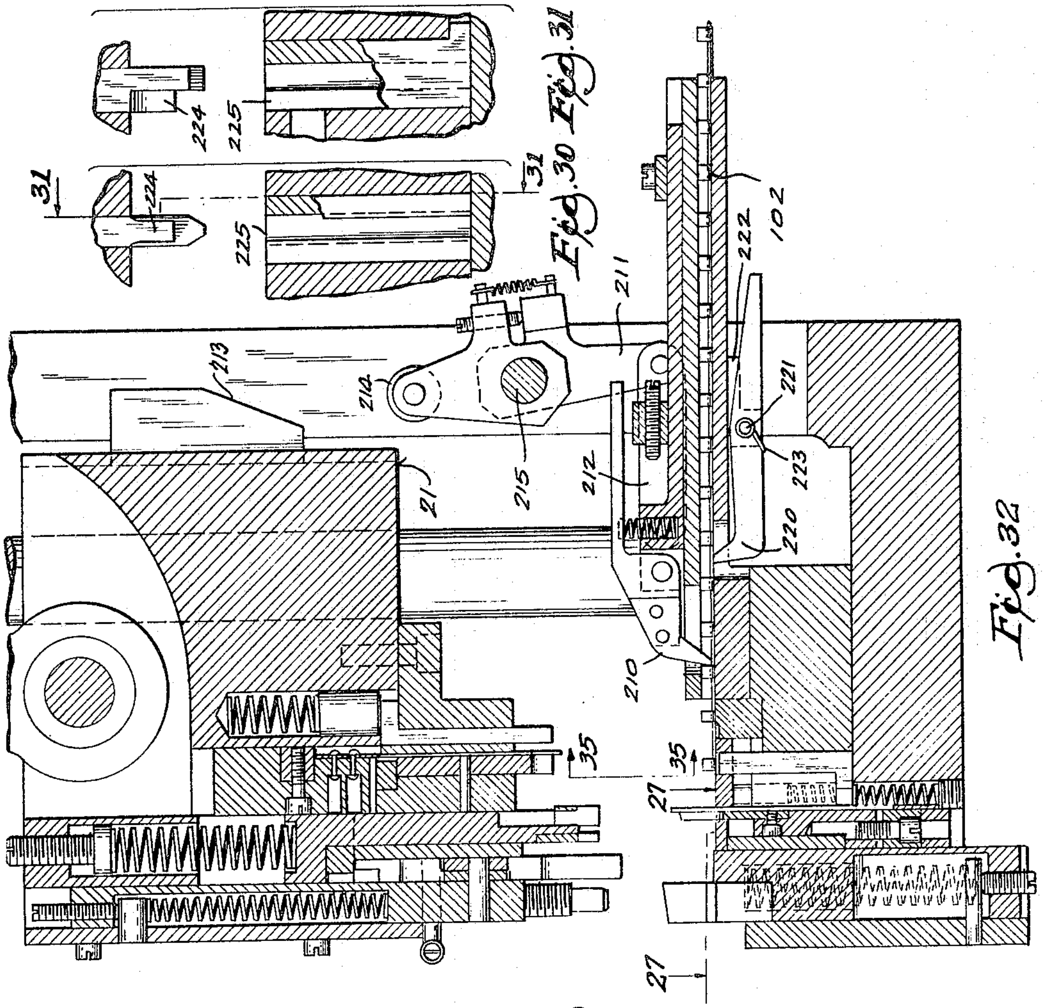
FIGURE 30 is an enlarged fragmentary view taken along line 30—30 of FIGURE 27.
FIGURE 31 is a part sectional view taken along line 31—31 of FIGURE 30.
FIGURE 32 is a sectional view taken along line 32—32 of FIGURE 26.
Figure 27:
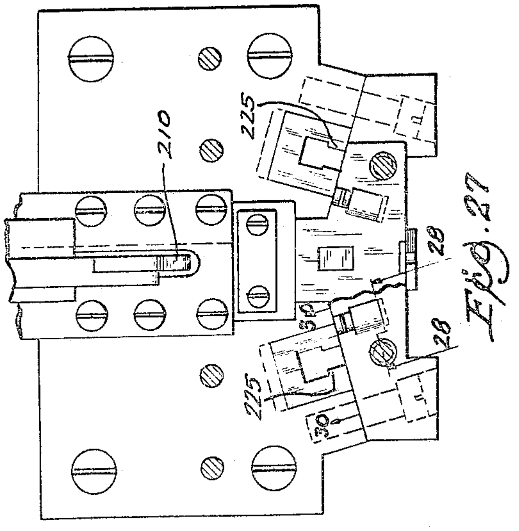
FIGURE 27 is a fragmentary view taken along line 27—27 of FIGURE 32.
Figures 28, 29:
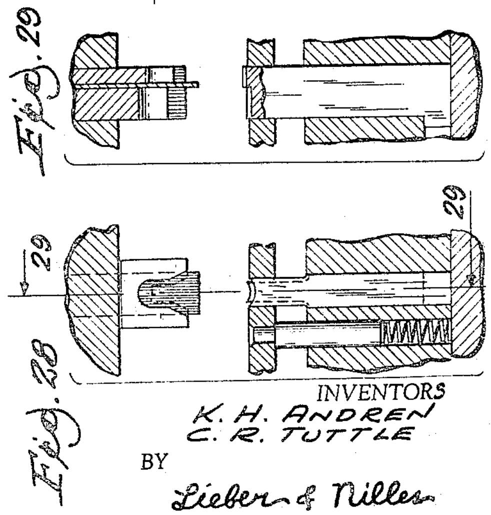
FIGURE 28 is a fragmentary view taken along line 28—28 of FIGURE 27.
FIGURE 29 is a fragmentary section taken along line 29—29 of FIGURE 28.

The severing of the individual terminals from the continuous strips is accomplished by cutting out a small piece of metal connecting each terminal in the terminal strip, and the small metal slugs thus cut out are allowed to fall away. To cut-off punch 224 (FIGURE 31) mounted in the clinching die section cuts against the cutoff die 225 in the anvil section, and the operations are all a repeat of those already described with respect to the first assemblage.

Various modes of carrying out the invention are contemplated as being within the scope of the following claims particularly pointing out and distinctly claiming the subject matter which is regarded as the invention:

We claim:

1. In a terminal attaching device, a supply of terminals for feeding along a center line of a terminal die, a supply of terminals for feeding along an axis in angular relation to said terminal die center line, means for feeding said terminals along said center line, means for feeding said terminals at an angle thereto, means for presenting a cord having a plurality of conductors to said terminals, means for simultaneously crimping a plurality of terminals on said plurality of conductors, and means actuated by said crimping means for advancing said terminals toward a terminal attaching zone.

2. A terminal attaching device according to claim 1, wherein the means for feeding the terminals includes a pawl actuated by said crimping means for advancing said terminals successively to the terminal attaching zone.

3. A terminal attaching device for simultaneously attaching a plurality of terminals to a like plurality of conductors of a multiple conductor cord, comprising, a supply of terminals adapted to be fed to said terminal attaching device from a first direction, another supply of terminals adapted to be fed to said terminal attaching device in a direction in angular relation to said first direction, means for feeding said terminals to a terminal attaching zone, means for crimping said terminals on said conductors simultaneously, means for introducing and spreading said conductors in said terminal attaching zone in substantial alignment with said terminals fed to the terminal attaching zone, and means actuated by said crimping means for actuating the means for feeding said terminals to the terminal attaching zone.

4. A terminal attaching device according to claim 3, wherein the means for feeding said terminals to the terminal attaching zone includes a terminal feed slide means actuated by said crimping means, and a terminal holding means to advance said terminals toward said terminal attaching zone, and wherein said terminal holding means rotates during advancement thereof to present the terminal in substantial alignment with one of said conductors.

5. A terminal attaching device according to claim 3, wherein the means for introducing and spreading said conductors includes a ramp for carrying said conductors over said terminals, and conductor spreader means for locating said conductors in substantial alignment with said terminals to be crimped.

6. A terminal attaching device according to claim 3, wherein the means for feeding said terminals to a terminal attaching zone includes a terminal feed slide means for advancing a terminal toward said terminal attaching zone, a feed pawl carrier for successively advancing single terminals for simultaneous attachment to a plurality of conductors, and a means for retracting said slide to receive a terminal for advancement of the next terminals to the terminal attaching zone.

7. A terminal attaching device according to claim 3, wherein a conveyor means advances said multiple conductor cord for stripping and slitting prior to presentation of the plurality of cords to said terminal attachment device, and wherein one end of said conductors receive a plurality of terminals thereon prior to conveyance by said conveyor to a discharge station.

8. In terminal attaching apparatus having a plurality of terminal attaching devices and a conveyor for moving a multi-conductor cord from one terminal attaching device to another for attachment of a variety of terminals to said multi-conductor cord, and wherein the terminals attached at one end of said cord may differ from terminals attached at the other end of said cord by a separate terminal attaching device, and wherein one of said terminal attaching devices simultaneously applies a plurality of terminals to one end of said cord, and wherein another terminal attaching device simultaneously applies a plurality of terminals to the other end of said cord so that the terminal attaching apparatus produces a continuous supply of completed terminated cords, and wherein each terminal attaching device is provided with a plurality of terminal supply means; said apparatus including a means of feeding said terminals toward said cord to be terminated, and means for presenting the end of said cord to be terminated in substantial alignment with said terminals fed to the terminal attaching device.

No references cited.

RICHARD H. EANES, Jr., *Primary Examiner.*